J. STANKUS.
MOWING MACHINE.
APPLICATION FILED MAR. 14, 1912.
1,045,627.
Patented Nov. 26, 1912.
2 SHEETS—SHEET 1.
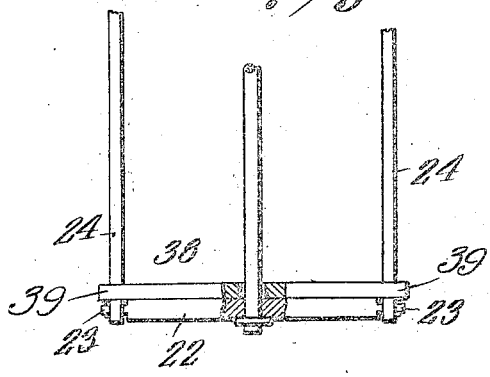
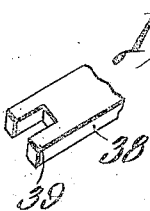
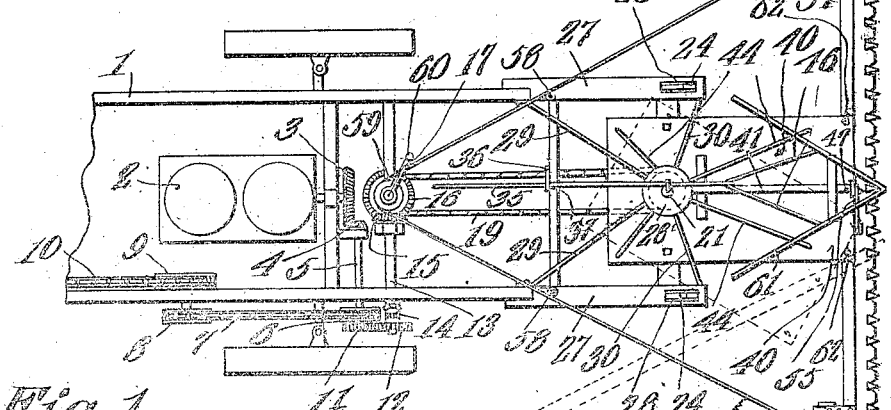
John Stankus,
Inventor
Witnesses
by
Attorneys J. STANKUS.
MOWING MACHINE.
APPLICATION FILED MAR. 14, 1912.
1,045,627.
Patented Nov. 26, 1912.
2 SHEETS—SHEET 2.
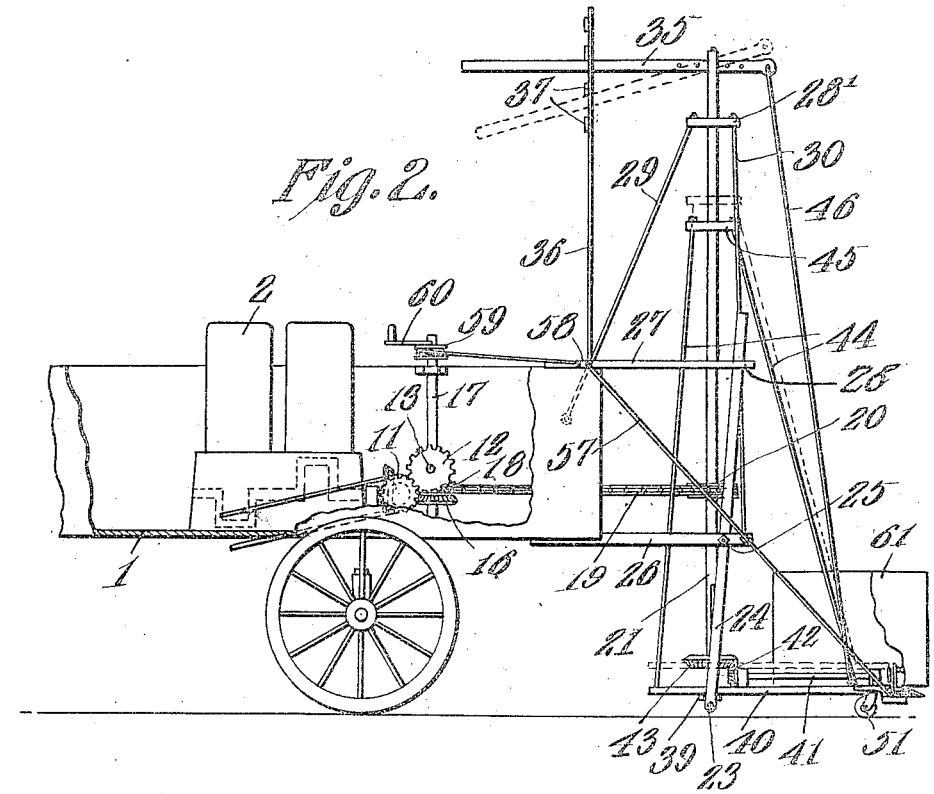
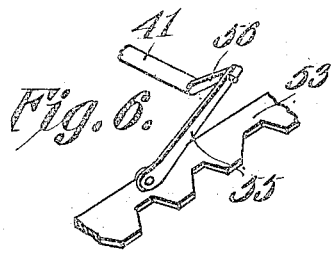
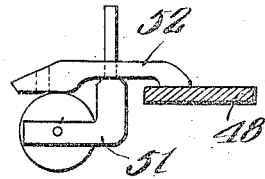
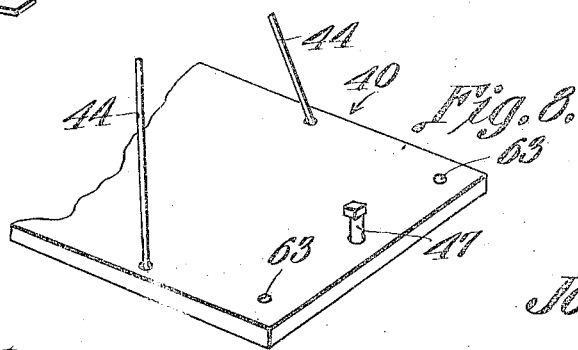
John Stankus, Inventor
Witnesses
by Attorneys

UNITED STATES PATENT OFFICE.

JOHN STANKUS, OF PORTAGE, PENNSYLVANIA.

MOWING-MACHINE.

1,045,627.

Specification of Letters Patent.   Patented Nov. 26, 1912.

Application filed March 14, 1912. Serial No. 683,670.

*To all whom it may concern:*

Be it known that I, JOHN STANKUS, a citizen of the United States, residing at Portage, in the county of Cambria and State of Pennsylvania, have invented a new and useful Mowing-Machine, of which the following is a specification.

This invention relates to mowing machines, one of its objects being to provide a motor propelled vehicle having a centrally supported finger bar and sickle in front thereof and which is adapted to be moved forward by the vehicle so as to cut the vegetation in the path thereof, means being employed for deflecting the material beyond the path of the motor vehicle.

Another object is to provide means whereby the finger bar and sickle can be quickly elevated by the operator so as to pass over a stump or any other obstruction in the path thereof.

Another object is to provide a finger bar and sickle which can be adjusted to any desired angle relative to the path of movement of the mechanism.

A further object is to provide an elongated finger bar and sickle which can be adjusted close to the sides of the vehicle when not in use so as to occupy the minimum space while the machine is being moved to or from the field.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings; Figure 1 is a plan view of a machine embodying the present improvements the end portions of the finger bar and sickle being broken away and the rear portion of the motor vehicle being removed, the position of the finger bar and sickle when adjusted to one side of the vehicle being indicated by dotted lines. Fig. 2 is a view partly in side elevation and partly in section of the parts shown in Fig. 1. Fig. 3 is an enlarged front elevation of the platform support and guide, parts being shown in section, and the upper ends of the shaft and hangers being broken away. Fig. 4 is a perspective view of one end portion of the cross bar carried by the support. Fig. 5 is a perspective view of the platform actuating lever and adjacent parts. Fig. 6 is a perspective view of a portion of the sickle and showing the means for operating the same from the drive shaft. Fig. 7 is an enlarged transverse section through a portion of the finger bar and showing one of the supporting casters. Fig. 8 is a perspective view of the front end portion of the platform with the finger bar removed therefrom.

Referring to the figures by characters of reference 1 designates the body of a motor vehicle, the motor being indicated at 2. This motor is provided with a drive gear 3 adapted to transmit motion, through a gear 4, to a shaft 5 having a sprocket 6 thereon. This sprocket transmits motion through a chain 7 and sprockets 8 and 9 to a drive chain 10 whereby the vehicle may be propelled forwardly or backwardly as desired.

A gear 11 is secured to shaft 5 and meshes with another gear 12 which is loose on a shaft 13. A clutch 14 is provided whereby this gear can be coupled to the shaft 13 whenever desired. A gear 15 is secured to the shaft 13 and meshes with another gear 16 secured to a vertical shaft 17. This vertical shaft is provided with a sprocket 18 which engages a forwardly extending chain 19 extending through the front end of the vehicle body 1 and engaging a sprocket 20. This last named sprocket is secured to a vertical shaft 21 the lower end of which is journaled within a cross bar 22. This bar has trunnions 23 at its ends pivotally mounted within hangers 24 which, as shown at 25, are pivotally connected to forwardly extending supporting strips 26 carried by the front end of the body 1. Additional strips 27 extend forwardly from the body and above the strips 26 and have slots 28 therein through which the upper ends of the hangers 24 project, said hangers being thus guided and held against lateral oscillation. It is to be understood, however, that the hangers are free to swing forwardly or rearwardly when necessary.

A guide head 28 is supported above the guide strip 27 and is held fixedly by downwardly diverging legs 29 and 30, the legs 29 being secured to the sides of the body 1 adjacent its front end while the legs 30 are secured to the forward ends of the strips 26. The upper portion of shaft 21 is mounted to slide and rotate within the head 28.

A cap 31 is secured to the upper end of the shaft 21 and a hook 32 has one end swiveled within this cap. The other end of the hook extends downwardly and is pivotally connected, as at 33, to another hook 34 adjustably engaged by a lever 35. Said hook 34 constitutes the fulcrum of the lever and it will be apparent that shaft 21 is free to rotate although supporting the lever 35. A standard 36 is mounted on the vehicle body and has outstanding stops 37 any one of which is adapted to be engaged by lever 35 whereby the said lever can be held at any angle to the body 1.

A cross bar 38 is loosely mounted on the lower portion of shaft 21 and has forked ends 39 slidably engaging and straddling the hangers 24. Mounted on this bar 38 is a platform 40 on which is journaled a forwardly extending shaft 41 located at the center of the platform and provided with a gear 42. This gear meshes with another gear 43 which is feathered on the lower portion of shaft 21. Rods 44 converge upwardly from the corners of the platform 40 and are secured, at their upper ends, to a head 45 which is slidably mounted on the shaft 21 at a point below the head 28. The forward end of lever 35 is connected to the front of the platform by downwardly diverging lifting rods 46.

A pivot bolt 47 is mounted at the center of the front end of platform 40 and is engaged by the middle portion of a finger bar 48 which extends laterally beyond the sides of the platform and is provided with one or more sections 49 hingedly connected thereto as indicated at 50. Casters 51 support the sections of the finger bar, each caster being mounted in a rearwardly extending tongue 52 projecting from the finger bar as shown particularly in Fig. 7. A sickle 53 made up of sections detachably connected, as at 54, is mounted on the finger bar and a pitman 55 connects one of the sections of the sickle to a crank 56 arranged at the front end of the shaft 41. Cables 57 are secured to the middle section of the finger bar 48 at points beyond the sides of the platform and extend upwardly past the guide sheaves 58 thence to a drum 59. This drum is mounted loosely on the upper portion of shaft 17 and may be rotated by means of a crank 60 secured to it.

A V-shaped deflecting shield 61 is mounted on the front portion of the platform 40 and is designed to deflect laterally the vegetation cut by the middle portion of the sickle so that the vehicle which is propelling the cutting mechanism can pass freely along a cleared path.

It will be understood that the finger bar 48 can be held against swinging movement in any suitable manner, as by means of locking pins or bolts 62 extending through the finger bar and through openings 63 in the front portion of the platform 40. With the parts thus held and the vehicle moving forward, it will be seen that the sickle will be reciprocated by crank 56 and piston and pitman 55, shaft 41 being driven by gears 42 and 43 from the shaft 21. This last named shaft is rotated by chain 19 and sprocket 20 and said chain is propelled by the mechanism under control of clutch 14. The finger bar and sickle can be of any length desired and it will be obvious that as the grain or grass is cut it will fall over the finger bar, that portion thereof in front of the platform 40 being shifted laterally by the shield 61. Should an obstruction appear in the path of the sickle, the operator can push downwardly on the rear end of lever 35. The hook 34 constitutes the fulcrum of this lever and, therefore, the front end of the lever will pull upwardly on the rods 46 and cause the platform 40 to slide upwardly along the shaft 21, the gear 43, shaft 41, finger bar and sickle moving with the platform. As soon as the obstruction has been passed the parts can be lowered and the operation will continue as before. It will be apparent that by placing lever 35 in engagement with a selected stop 37, the platform 40 can be maintained at any elevation desired.

It is to be understood that when it is desired to shift the finger bar and sickle relative to the platform, the pins 62 are first removed after which the drum 59 is rotated. The cables 57 will thus be actuated so as to swing the finger bar relative to the platform. Furthermore, if desired, the platform can be swung upon the shaft 21 as a fulcrum, as shown by dotted lines in Fig. 1. The finger bar and sickle can be held diagonally of the path of the machine while the machine is being moved to or from a field and, under these conditions, the hinged sections of the finger bar can be folded inwardly against the vehicle if desired.

What is claimed is:—

1. The combination with a motor propelled vehicle, of a mowing mechanism pivotally supported at its center in front of and extending laterally beyond the path of the vehicle, means operated by the motor of the vehicle for actuating said mechanism, said means including a vertical pivot and means under the control of the operator for swinging the mowing mechanism horizontally into and out of operative position about its vertical pivot and relative to the vehicle.

2. The combination with a motor propelled vehicle, of a platform supported in front thereof, means under the control of the operator for raising and lowering the platform vertically, a mowing mechanism connected at its center by a vertical pivot to the platform and extending laterally beyond the sides thereof, means for swinging said element about its pivot and in a horizontal plane, and means operated by the motor of the vehicle for actuating said mechanism irrespective of the elevation of the platform or of its angle of adjustment.

3. The combination with a motor vehicle, of a platform supported in front thereof, a mowing mechanism connected to the front end of the platform and including a sickle, drive mechanism operated by the motor, said mechanism including a vertical shaft for transmitting power to the sickle and said shaft constituting a guide for the platform, and means for raising and lowering the platform.

4. The combination with a motor vehicle, of a platform supported in front thereof, a mowing mechanism adjustably connected to the platform and including a sickle, drive mechanism operated by the motor of the vehicle, said mechanism including a vertical shaft for transmitting power to the sickle, said shaft constituting a guide for the platform, means for raising and lowering the platform along the guide.

5. The combination with a motor vehicle, of a platform supported in front thereof, a mowing mechanism pivotally connected to the front end of the platform and extending laterally therebeyond, said mechanism including a sickle, means for holding said element against movement relative to the platform, drive means operated by the motor of the vehicle, said means including a vertical shaft for transmitting power to the sickle, said shaft constituting a guide for the platform, means under the control of the operator for raising and lowering the platform upon said guide, and means under the control of the operator for swinging the mowing element relative to the vehicle.

6. The combination with a motor vehicle, of hangers depending therefrom, a connection between the hangers, a vertical shaft journaled at its lower end within said connection, a bearing for the upper end portion of the shaft, a platform slidably mounted on said shaft, means under the control of the operator for raising and lowering the shaft, means for rotating the shaft independently of the platform, a mowing mechanism carried by the platform, and means for transmitting motion from said shaft to the mowing mechanism.

7. The combination with a motor propelled vehicle, of a platform carried by the front end thereof, means under the control of the operator for raising and lowering the platform, a V-shaped deflecting shield upon the platform, a mowing mechanism connected to the front end of the platform and extending laterally therebeyond, means for transmitting motion to said mechanism from the motor of the vehicle, said means including a vertical shaft constituting a guide for the platform.

In testimony that I claim the foregoing as my own, I have hereto affixed my signature in the presence of two witnesses.

JOHN STANKUS.

Witnesses:
 A. B. GOLDSTEIN,
 J. GOODMAN.